United States Patent [19]
Koebel

[11] Patent Number: 4,574,740
[45] Date of Patent: Mar. 11, 1986

[54] LIVESTOCK FEEDER

[76] Inventor: Sam C. J. Koebel, P.O. Box 638, Jasper, Alberta, Canada, T0E 1E0

[21] Appl. No.: 669,233

[22] Filed: Nov. 7, 1984

[51] Int. Cl.⁴ .............................................. A01K 1/10
[52] U.S. Cl. ........................................ 119/60; 256/26
[58] Field of Search ................ 119/58, 59, 60; 256/26

[56] References Cited

U.S. PATENT DOCUMENTS 2,768,607 10/1956 McClure, Jr. ........................ 119/60
3,067,723 12/1962 Norwood ........................... 119/60 X
3,802,394  4/1974 Mahler ............................... 119/60 X
4,089,301  5/1978 Harden ................................ 119/60

Primary Examiner—Robert P. Swiatek
Attorney, Agent, or Firm—Kane, Dalsimer, Kane, Sullivan and Kurucz

[57] ABSTRACT

A livestock feeder for hay bales, stacks and the like comprising fence-like sides and ends hinged to each other at their ends and pivotally supported on posts centrally secured to the ends, to permit movement from a normal rectangular configuration to one of a parallelogram with the side sections closer to each other. Such a construction permits animals feeding along the sides of the feeder, to have access to feed in the center of the feeder as they bear against the sides thereby collapsing them inwardly.

6 Claims, 6 Drawing Figures

LIVESTOCK FEEDER

BACKGROUND OF THE INVENTION

The present invention relates to a livestock feeder for hay bales, stacks and the like, and more particularly relates to a livestock feeder which enables animals feeding about its perimeter to have access to feed in the center of the feeder.

Where feed for livestock is left completely accessible and no controls are placed on the animal's feeding, there is much wastage of the feed. For example cattle tend to eat from the top to the bottom of a haystack, and climb up into the stack. Much of the hay is trampled by the cattle and cattle will not eat trampled hay.

Livestock feeders having fences within which feed for livestock is contained, and outside the perimeter of which livestock stand to feed, are well-known in the prior art. Such feeders permit large quantities of feed, such as hay, to be placed in reach of livestock without being spoiled, damaged or otherwise wasted, while the livestock are feeding. Often they are portable and can be readily moved from one location to another to provide clean surroundings for the livestock.

Prior art livestock feeders of general background interest with respect to the present invention are described and illustrated in U.S. Pat. Nos. 3,004,518 of Struckhoff issued Oct. 17, 1961, 3,067,723 of Norwood issued Dec. 11, 1962, 3,092,077 of Smoker et al issued June 4, 1963, 3,738,327 issued June 12, 1973 of Stirling, 3,832,977 of Ladewig et al issued Sept. 3, 1974, 3,906,902 of Rose issued Sept. 23, 1975, and 4,148,278 of Anderson issued Apr. 10, 9179, as well as in Canadian Pat. Nos. 555,152 of Hanson issued Apr. 1, 1958 and 1.061,663 of Schoessow issued Sept. 4, 1979.

Unless such feeders are of relatively small dimensions, in which case they will likely have insufficient capacity, hay or other feed in the center of the feeders cannot be reached by the livestock feeding therein. In order to avoid this problem, hay stack feeders made of fences hinged together at adjacent ends, permitting the feeder to collapse inwardly have been developed. Examples of such feeders are described and illustrated in U.S. Pat. Nos. 3,834,353 of Groezinger issued Sept. 10, 1974, 4,089,301 of Harden issued May 16, 1978; 4,193,378 of Harden issued Mar. 18, 1980, and 4,346,671 of Wagner issued Aug. 31, 1982. These references describe and illustrate feeders in which the collapsed configuration generally is of triangular shape, still oftentimes making it difficult for livestock to feed on hay or the like left in the center of the triangular area or areas circumscribed by the collapsed sections.

It is an object of the present invention to provide a unique and original hay stack feeder, of the hinged panel or fence construction, which will enable collapsing of the panels in such a manner that hay in the center of the feeders can be reached by livestock. It is a further objection of the present invention to provide such a feeder which provides good feed retaining capacity and restricts wastage of feed by livestock feeding thereon.

SUMMARY OF THE INVENTION

According to the present invention there is provided a livestock feeder for hay bales, stacks and the like. The livestock feeder comprises fence-like sides and ends hinged to each other at their meeting corners to normally form a rectangle. A vertical post is secured centrally to each end section. In operation, these two posts support the sides and ends in such a manner as to permit pivoting movement of the ends about the axes of the posts. Animals feeding along the sides of the feeder on feed therein, bear against the sides to move the sides progressively inwardly towards each other. The end sections pivot in similar fashion about the posts, and the sides move in parallel fashion towards each other, as the animals consume feed near the sides and progressively seek feed closer to the center of the feeder.

In a preferred embodiment of the present invention, the side sections and end sections are provided with a number of V-shaped openings positioned through which the heads of livestock feeding on feed within the feeder can extend while feeding.

The feeder according to the present invention is of extremely simple construction, essentially being supported on only two posts. The feeder enables animals to reach feed in its very center, as the animals collapse the side sections towards the center as they feed. Thus the feeder does not have to be reloaded, as in the case of most prior art feeders, before it is completely empty, because all of the hay kept within the feeder is accessible to the animals. As well, when the V-shaped openings are provided in the sides of the feeder, this shape prevents the animal from pulling its head straight back and out from the feeder. It must first lift its head. This keeps the animal from dragging hay out of the feeder and wasting it.

BRIEF DESCRIPTION OF THE DRAWINGS

These and other objects and advantages of the invention will become apparent upon reading the following detailed description and upon referring to the drawings in which.

Figure 1:
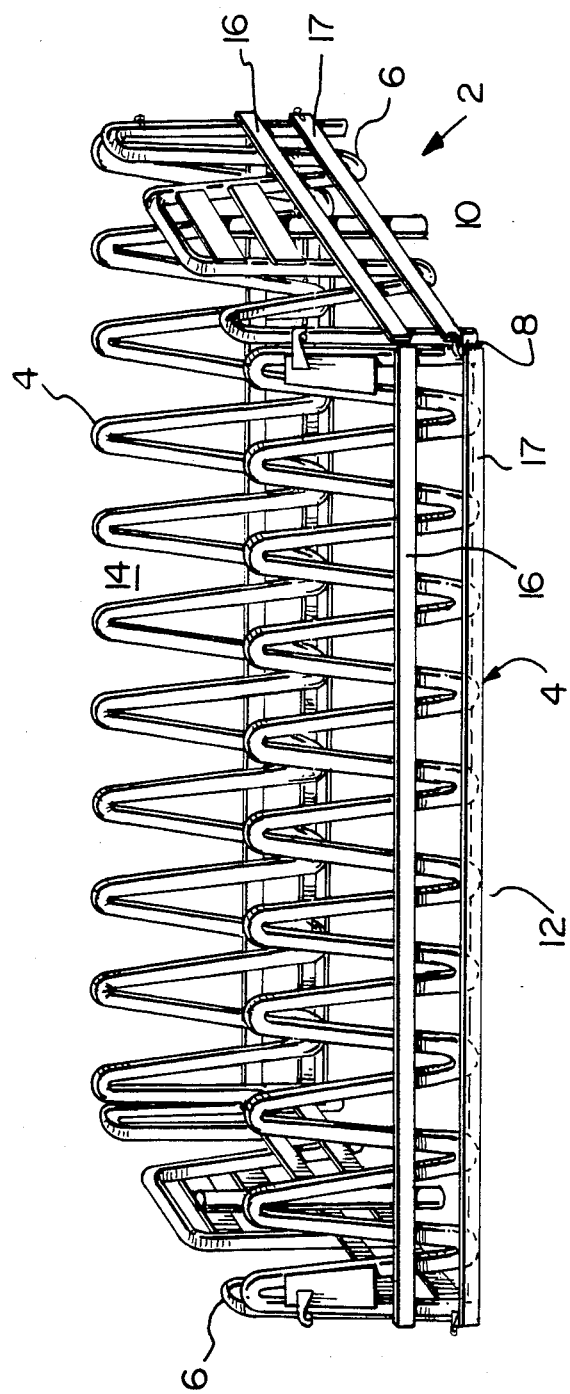
FIG. 1 is a perspective view of the device according to the present invention.

While the invention will be described in conjunction with an example embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 2:
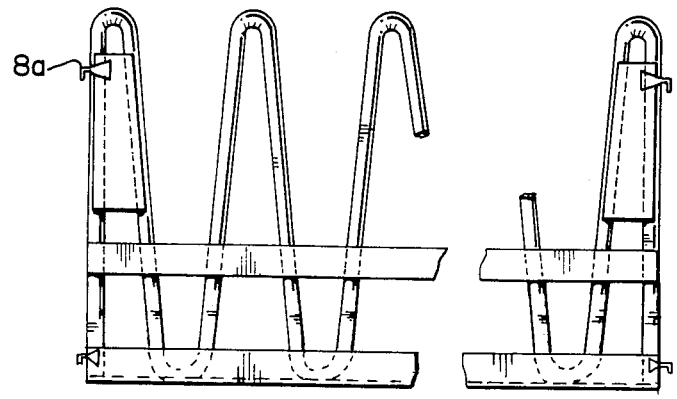
FIG. 2 is a partial side view of one of the sides of the device according to the present invention.
Figure 3:
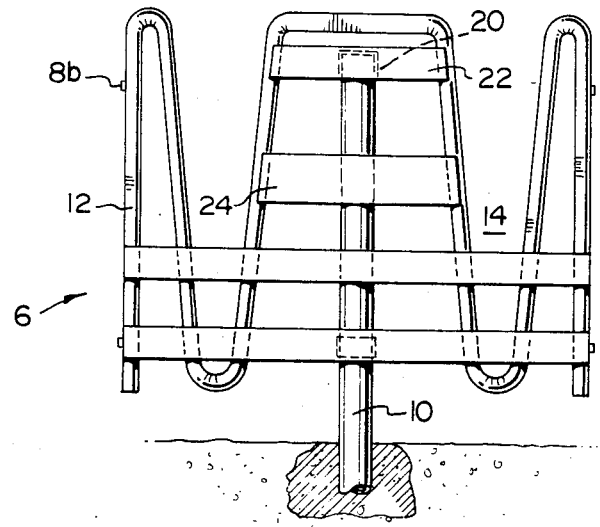
FIG. 3 is a partial side view of one of the ends of the feeder of FIG. 1.
Figure 4:
FIG. 4 is a plan view, from the top, of the end section of FIG. 3.
Figures 5A, 5B:
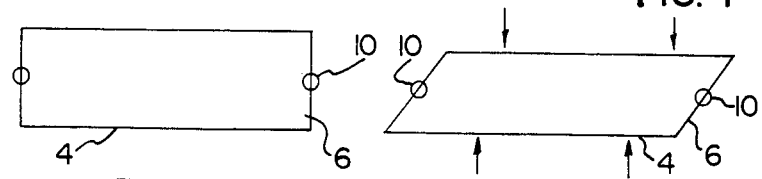
FIGS. 5a and 5b are schematic plan views of the feeder according to the present invention in, rspectively, normal and partially collapsed configurations.

Turning to FIG. 1, there is shown a livestock feeder 2 according to the present invention, comprising fence-like sides or panels 4 and ends or panels 6. Adjacent ends of the sides and ends, where they meet at the corners of the feeder, are secured together by means of hinges 8. These hinges may be made, for example, of hinge pins 8a (FIG. 2) which are insertable into sockets 8b (FIG. 3). End sections 6 are pivotally supported, as illustrated (FIGS. 1 and 3) on posts 10 to permit the feeder to move from its normal rectangular configuration (FIG. 5a) to the parallelogram configuration in which sides 4, still parallel to each other, approach each other and the center of the feeder (FIG. 5b). As can be seen in FIG. 1, posts 10 hold the side and end sections above the ground, so that they are free to move in this fashion. This movement is achieved when animals outside the perimeter of the feeder, feeding on hay bales or stacks within, bear against side sections 4 or end section 6, causing the side sections to move towards each other progressively away from the normal rectangular configuration of FIG. 5a, as the animals progressively seek feed closer to the center of the feeder.

In the preferred construction of the livestock feeder according to the present invention, as shown in the drawings, sides 4 and ends 6 are constructed from square steel tubing 12 (e.g. 1¼ inch) which is curved, in undulating fashion as illustrated, to form a series of adjacent V-shaped openings 14, through which the livestock can pass their heads for feeding. These V-shaped openings are formed and positioned so that an animal cannot pull its head straight back and out from the feeder. It must first lift its head. This feature keeps the animals from dragging hay out of the feeder and wasting it. The square steel tubing is further strengthened by means of a steel plate 16 and lengths of angle iron 17 welded along the length of each of the side sections. As well similar steel plates 16 and angle irons 17 are welded along the length of tubing 12 making up ends 6.

Posts 10, on which end sections 6 are supported for pivotable movement are for example embedded in cement in the ground for proper support (FIG. 3). These posts are seated in steel caps 20 secured to end sections 6 by means of steel plates 22 welded to the caps 20 and tubing 12 as illustrated. As well, steel plates 24 similarly secured to tubing 12 may be provided with appropriate collars through which posts 10 extend, to further stabilize and guide ends 6 in their pivoting movement on posts 10.

The collapsible nature of feeder 2 according to the present invention allows animals to reach hay even in the very center of the feeder as they push sides 4 towards the center as they feed. Thus, hay or other feed within the feeder can be completely exhausted by the animals before it is necessary to reload the feeder.

It has been found that with a feeder having sides fifteen and a half feet long and ends five feet long, three standard round bales of hay can be readily held within the feeder. Of course, if larger bales are required the dimensions of the side and end sections can be changed accordingly. Twenty-four animals can feed at one time in the illustrated feeder. Loading is easily accomplished by lifting one end of a side to release the hinges, swinging it back and rolling the bales in. Because the top of the feeder is open, the bales can also be loaded from above.

Thus it is apparent that there has been provided in accordance with the invention a livestock feeder that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A livestock feeder for hay bales, stacks and the like, comprising fence-like sides and ends hinged to each other at their meeting corners to normally form a rectangle, a vertical post secured centrally to each end in such a manner as to permit pivoting movement of that end on the post about its axis, in operation the sides and ends to be supported by these two posts so that animals feeding along the sides of the feeder on feed therein bear against the sides to move the sides progressively inwardly towards each other, the ends pivoting in similar fashion about the posts and the sides collapsing in parallel fashion towards each other, as the animals consume feed near the sides and progressively seek feed closer to the center of the feeder.

2. A feeder according to claim 1 wherein the side sections have a series of adjacent V-shaped openings positioned through which the heads of livestock feeding on feed within the feeder can extend while feeding.

3. A feeder according to claim 2 wherein the V-shaped openings are formed by lengths of square steel tubing appropriately bent to form the V-shaped openings.

4. A feeder according to claim 2 wherein similar V-shaped openings are provided in the ends.

5. A feeder according to claim 4 wherein the V-shaped openings are formed by approrpriately bent lengths of tubing.

6. A livestock feeder for hay bales and stacks and the like comprising fence-like sides and ends hinged to each other at their meeting corners to normally form a rectangle, a vertical post secured centrally to each end in such a manner as to permit pivoting movement of that end on the post about its axis, the side sections comprising a series of adjacent V-shaped openings positioned through which the heads of livestock feeding on feed within the feeder can extend to receive the feed, the ends being provided with similar V-shaped openings, the V-shaped openings of the ends and sides being formed from appropriately bent lengths of tubing, in operation the sides and ends to be supported by these two posts so that animals feeding along the sides of the feeder on feed therein bear against the sides to move the sides progressively inwardly towards each other, the ends pivoting in similar fashion about the posts and the sides moving in parallel fashion towards each other, as the animals consume feed near the sides and progressively seek feed closer to the center of the feeder.

* * * * *